United States Patent
Riley et al.

(10) Patent No.: US 11,261,104 B2
(45) Date of Patent: Mar. 1, 2022

(54) OIL-ABSORBENT SKIMMERS

(71) Applicant: New Pig Corporation, Tipton, PA (US)

(72) Inventors: Matthew James Riley, Hollidaysburg, PA (US); Benjamin David VanOuse, Bellefonte, PA (US)

(73) Assignee: New Pig Corporation, Tipton, PA (US)

( * ) Notice: Subject to any disclaimer, the term of this patent is extended or adjusted under 35 U.S.C. 154(b) by 0 days.

(21) Appl. No.: 16/805,165

(22) Filed: Feb. 28, 2020

(65) Prior Publication Data
US 2020/0277203 A1 Sep. 3, 2020

Related U.S. Application Data (60) Provisional application No. 62/812,673, filed on Mar. 1, 2019.

(51) Int. Cl.
*C02F 1/40* (2006.01)
*C02F 1/28* (2006.01)
(Continued)

(52) U.S. Cl.
CPC ............... *C02F 1/285* (2013.01); *C02F 1/40* (2013.01); *C02F 2101/32* (2013.01);
(Continued)

(58) Field of Classification Search
CPC .......... C02F 1/285; C02F 2101/32; C02F 2103/001; C02F 2201/002; C02F 1/40;
(Continued)

(56) References Cited

U.S. PATENT DOCUMENTS

| | | | |
|---|---|---|---|
| 3,668,118 A * | 6/1972 | Rhodes | E02B 15/042 210/671 |
| 3,794,583 A * | 2/1974 | Rhodes | B01D 17/0202 210/649 |

(Continued)

FOREIGN PATENT DOCUMENTS

| | | |
|---|---|---|
| GB | 2029254 A | 3/1980 |
| GB | 2276331 A | 9/1994 |

OTHER PUBLICATIONS

Stormwater BMP Products, ADSORB-it Filtration Products sales brochure, Jan. 2016 [retrieved on Jan. 6, 2021], Retrieved from the internet; <www.stormh20bmp.com/adsorb-it-products.html>. (Year: 2016).*

(Continued)

*Primary Examiner* — Matthew O Savage
(74) *Attorney, Agent, or Firm* — Alan G. Towner; Leech Tishman Fuscaldo & Lampl (57) ABSTRACT

Oil-absorbent skimmers of the present invention include an upper oil-absorbent flotation head that floats on water and several absorbent strands attached to the underside of the flotation head. The flotation head has a liquid-permeable cover with absorbent strips inside. The absorbent strips and strands are made of oil-absorbing materials that resist absorption of water. The passive oil-absorbent skimmers may be free-floating and may be used in stormwater catch basins, water holding tanks, vaults, sumps, bilges and the like for capturing hydrocarbons such as oil and oil-based liquids.

23 Claims, 12 Drawing Sheets

(51) Int. Cl.
*C02F 101/32* (2006.01)
*C02F 103/00* (2006.01)

(52) U.S. Cl.
CPC .. *C02F 2103/001* (2013.01); *C02F 2201/002* (2013.01); *C02F 2303/16* (2013.01)

(58) Field of Classification Search
CPC ............... C02F 2303/16; Y02A 20/204; B01D 17/0202; B01D 17/0205; E02B 15/101
See application file for complete search history.

(56) References Cited

U.S. PATENT DOCUMENTS

| | | | |
|---|---|---|---|
| 3,849,989 A | 11/1974 | Preus | |
| 6,099,723 A | 8/2000 | Morris et al. | |
| 6,221,243 B1 | 4/2001 | Flanagan | |
| 6,485,229 B1 | 11/2002 | Gunderson, III et al. | |
| 6,551,023 B2 | 4/2003 | Allard | |
| 6,869,525 B1 | 3/2005 | Happel | |
| 6,908,549 B2 | 6/2005 | Middleton et al. | |
| 7,229,560 B2 | 6/2007 | Rink et al. | |
| 7,300,574 B1 | 11/2007 | Lewis | |
| 7,404,892 B2 | 7/2008 | Shaw et al. | |
| 7,455,766 B1 | 11/2008 | Lewis | |
| 7,807,051 B2 | 10/2010 | Jack et al. | |
| 7,857,966 B2 | 12/2010 | Duran et al. | |
| 8,906,232 B2 | 12/2014 | Mcinnis | |
| 9,011,680 B2 | 4/2015 | Hansen | |
| 2010/0147756 A1* | 6/2010 | Duran | B01D 17/0214 210/170.03 |
| 2011/0280660 A1 | 11/2011 | Bahukudumbi | |
| 2011/0287929 A1* | 11/2011 | Smith | B01J 20/261 502/402 |
| 2011/0309022 A1* | 12/2011 | Briggs | B01D 17/0202 210/663 |
| 2012/0061323 A1 | 3/2012 | Stewart et al. | |
| 2014/0202945 A1 | 7/2014 | Lee | |

OTHER PUBLICATIONS

Web Archive, Mar. 2021 [retrieved on Mar. 16, 2021], Retrieved from the internet;<https://web.archive.org/web20160101000000*/http://www.stormh20bmp.com/adsorb-it-products.html>. (Year: 2021).*
The International Search Report and the Written Opinion of the International Searching Authority for International Application No. PCT/US2020/020425, 13 pages.

* cited by examiner

OIL-ABSORBENT SKIMMERS

CROSS-REFERENCE TO RELATED APPLICATION

This application claims the benefit of U.S. Provisional Patent Application Ser. No. 62/812,673 filed Mar. 1, 2019, which is incorporated herein by reference.

FIELD OF THE INVENTION

The present invention relates to absorbent skimmers, and more particularly relates to passive oil-absorbent skimmers.

BACKGROUND INFORMATION

Stormwater catch basins, water holding tanks, vaults, sumps, bilges and other water-containing structures are susceptible to contamination from oil spillage. Various types of filters have been proposed to capture oil spillage in such structures.

SUMMARY OF THE INVENTION

Oil-absorbent skimmers of the present invention include an upper oil-absorbent flotation head that floats on water comprising a liquid-permeable cover with absorbent strips inside, and several absorbent strands attached to the underside of the flotation head. The absorbent strips and strands are made of oil-absorbing materials that resist absorption of water. The passive oil-absorbent skimmers may be free-floating and may be used in stormwater catch basins, water holding tanks, vaults, sumps, bilges and the like for capturing hydrocarbons such as oil and oil-based liquids.

An aspect of the present invention is to provide an oil-absorbent flotation skimmer comprising an absorbent flotation head structured and arranged to float on water when the oil-absorbent flotation skimmer is deployed into the water. The absorbent flotation head comprises a liquid permeable cover and oil-absorbent strips within the liquid permeable cover. Multiple oil-absorbent strands are attached to the absorbent flotation head and are structured and arranged to spread out from the absorbent flotation head into the water when the oil-absorbent flotation skimmer is deployed into the water.

Another aspect of the present invention is to provide a method of removing oil from water contained in a water-containing structure. The method comprises deploying the oil-absorbent flotation skimmer as described above into the water-containing structure, allowing the deployed oil-absorbent flotation skimmer to freely float on a surface of the water to capture oil contained in the water, and recovering the oil-absorbent flotation skimmer and captured oil from the water-containing structure.

These and other aspects of the present invention will be more apparent from the following description.

DETAILED DESCRIPTION

Figure 1:
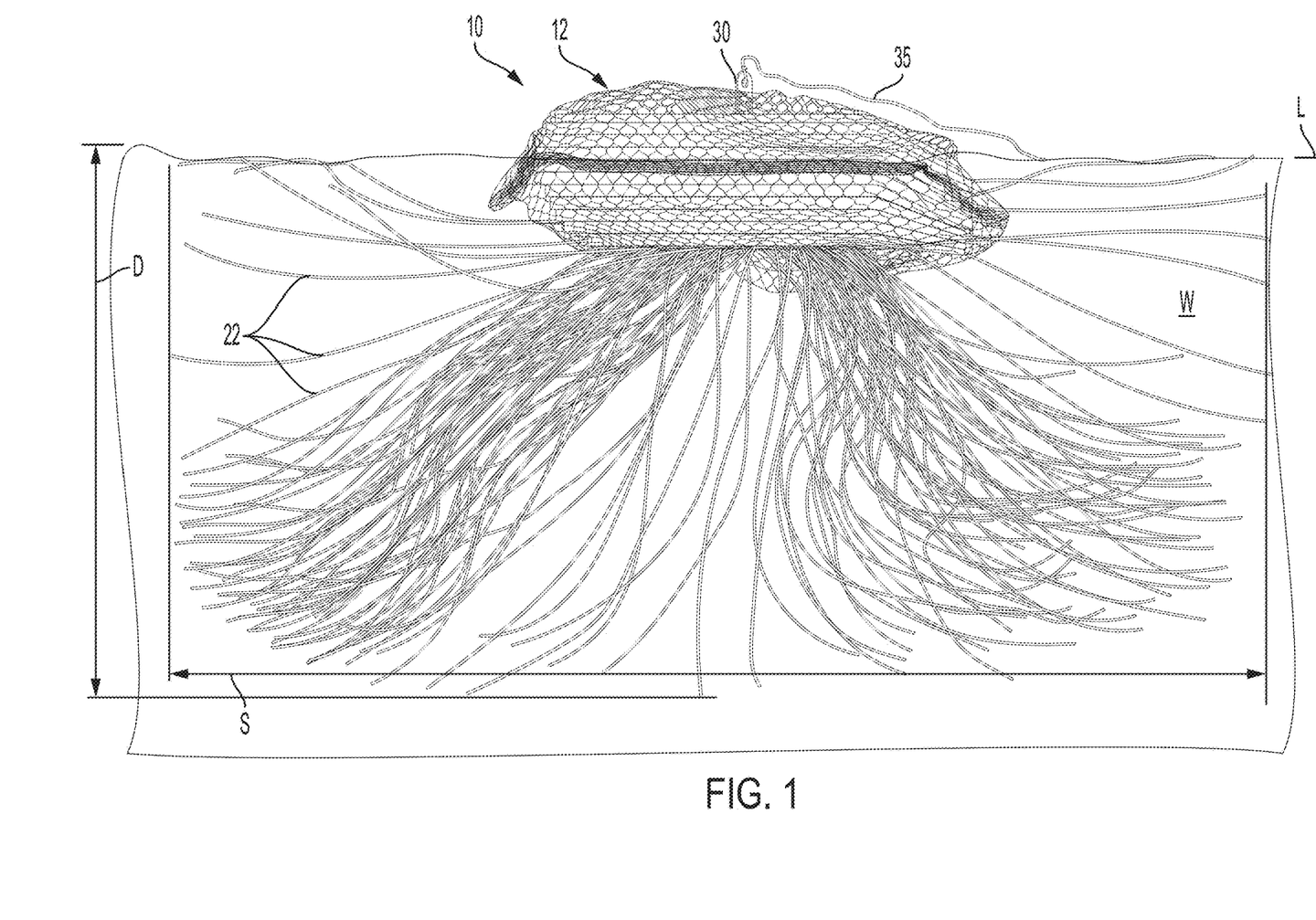
FIG. 1 is an elevation view of a deployed oil-absorbent flotation skimmer of the present invention floating in water.
Figure 2:
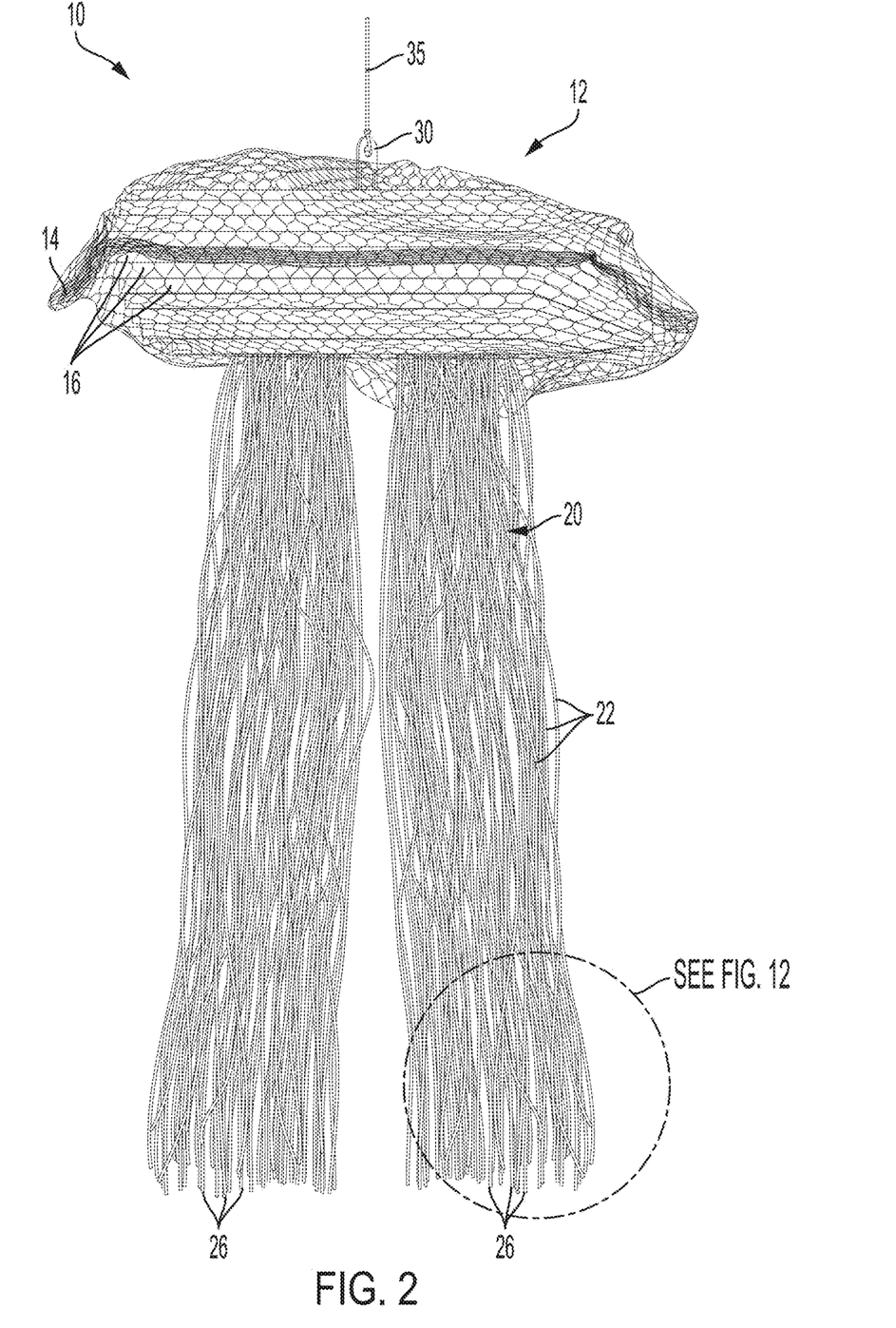
FIG. 2 is a front view of an oil-absorbent flotation skimmer of the present invention prior to deployment supported by a support cord.
Figure 3:
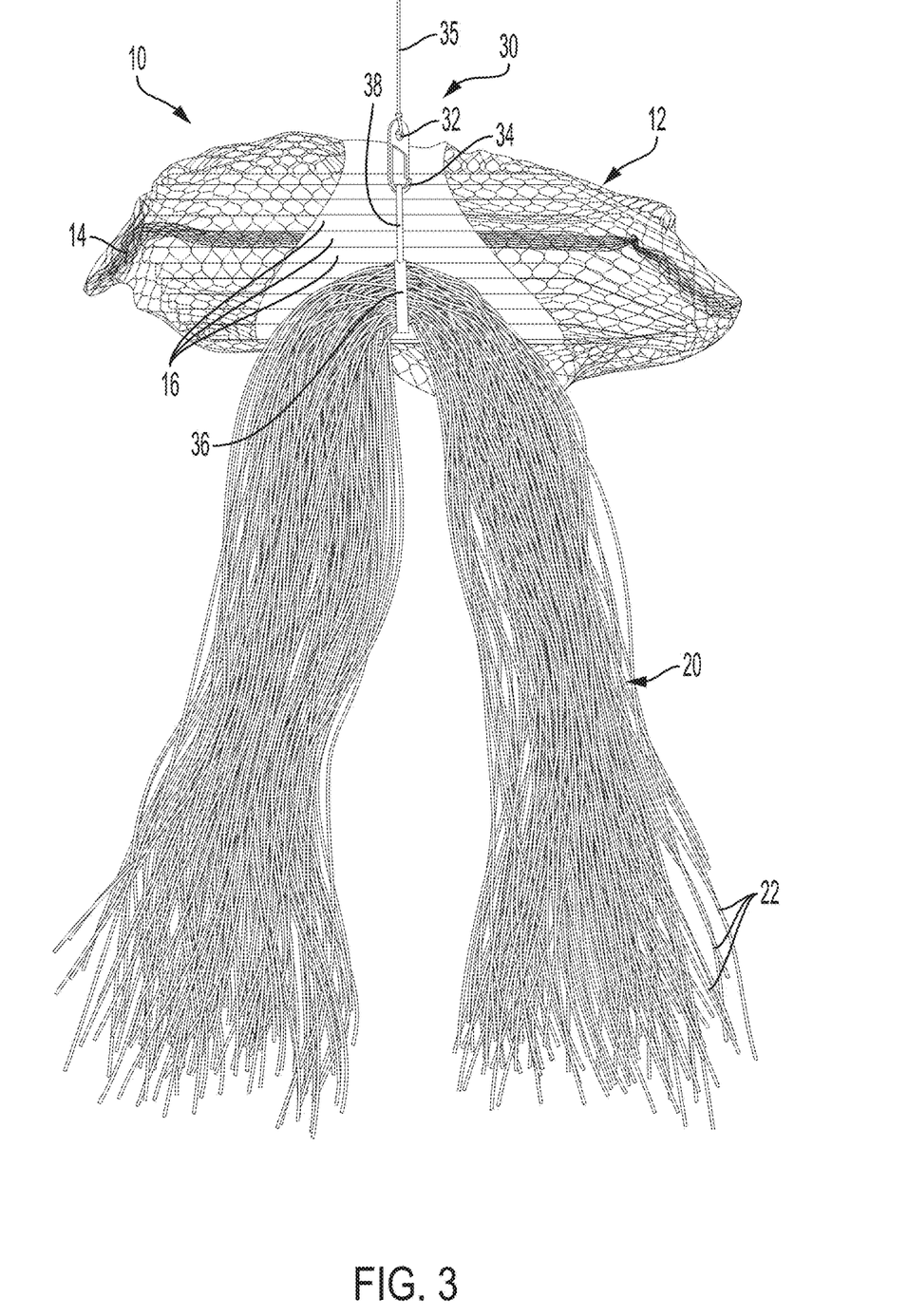
FIG. 3 is a front view of the oil-absorbent flotation skimmer of FIG. 2 with a portion broken away to show interior features of the skimmer.
Figure 4:
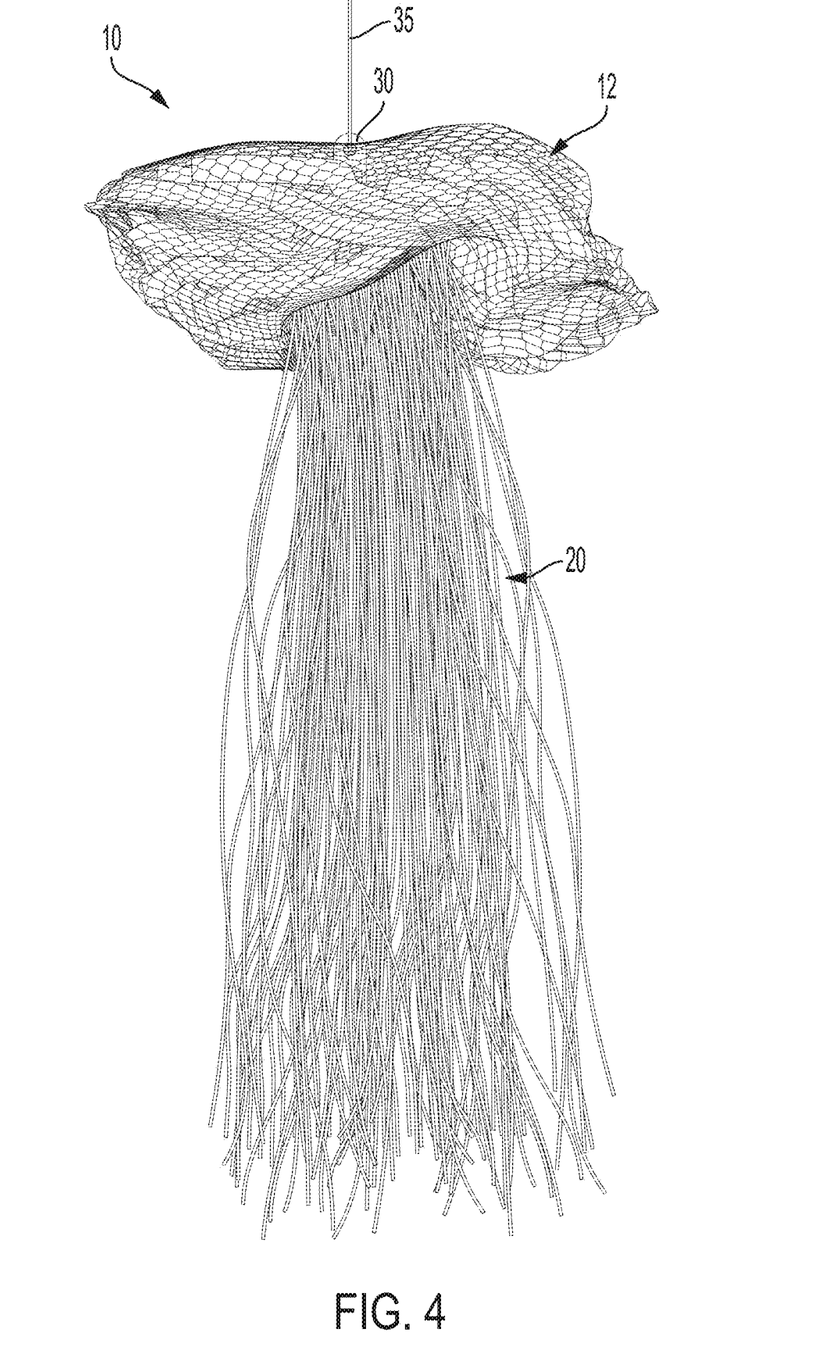
FIG. 4 is a right side view and FIG. 5 is a left side view of the oil-absorbent flotation skimmer of FIG. 2.
Figure 5:
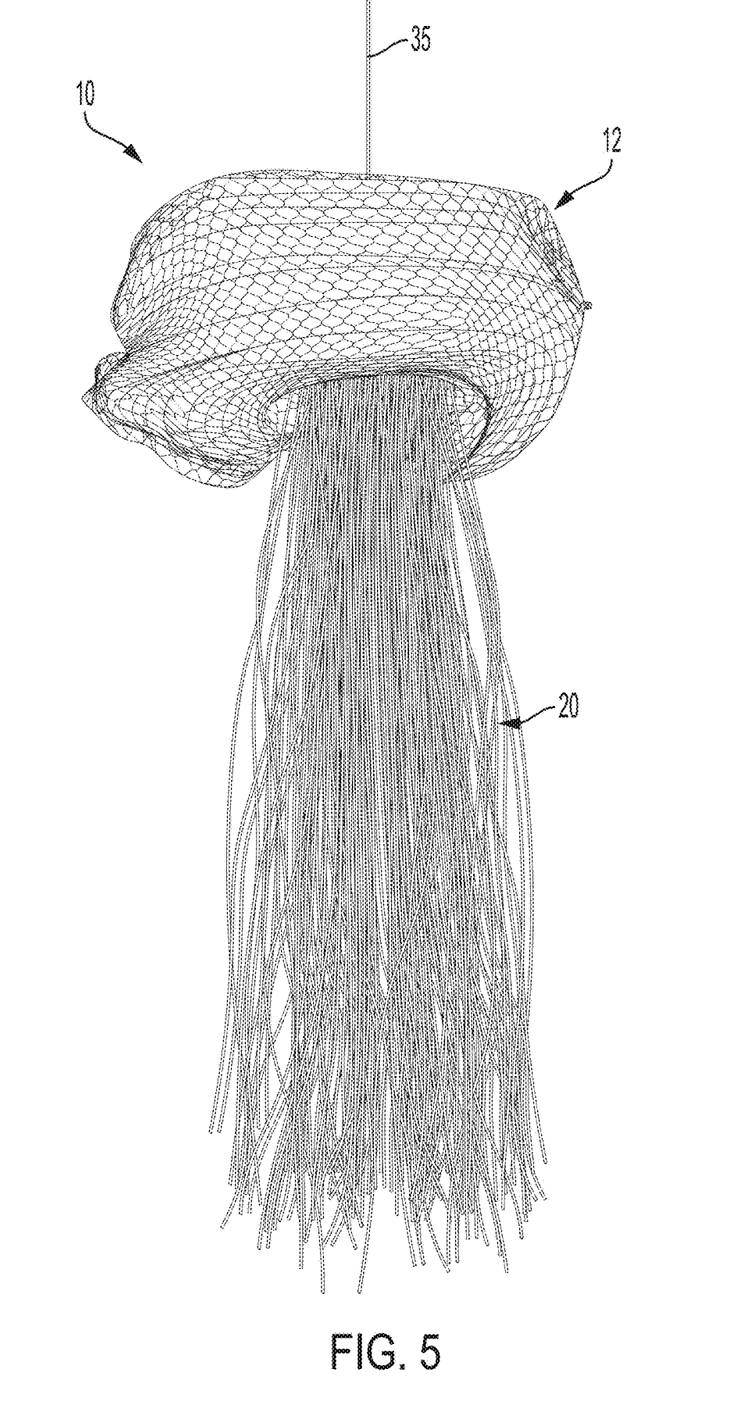
Figure 6:
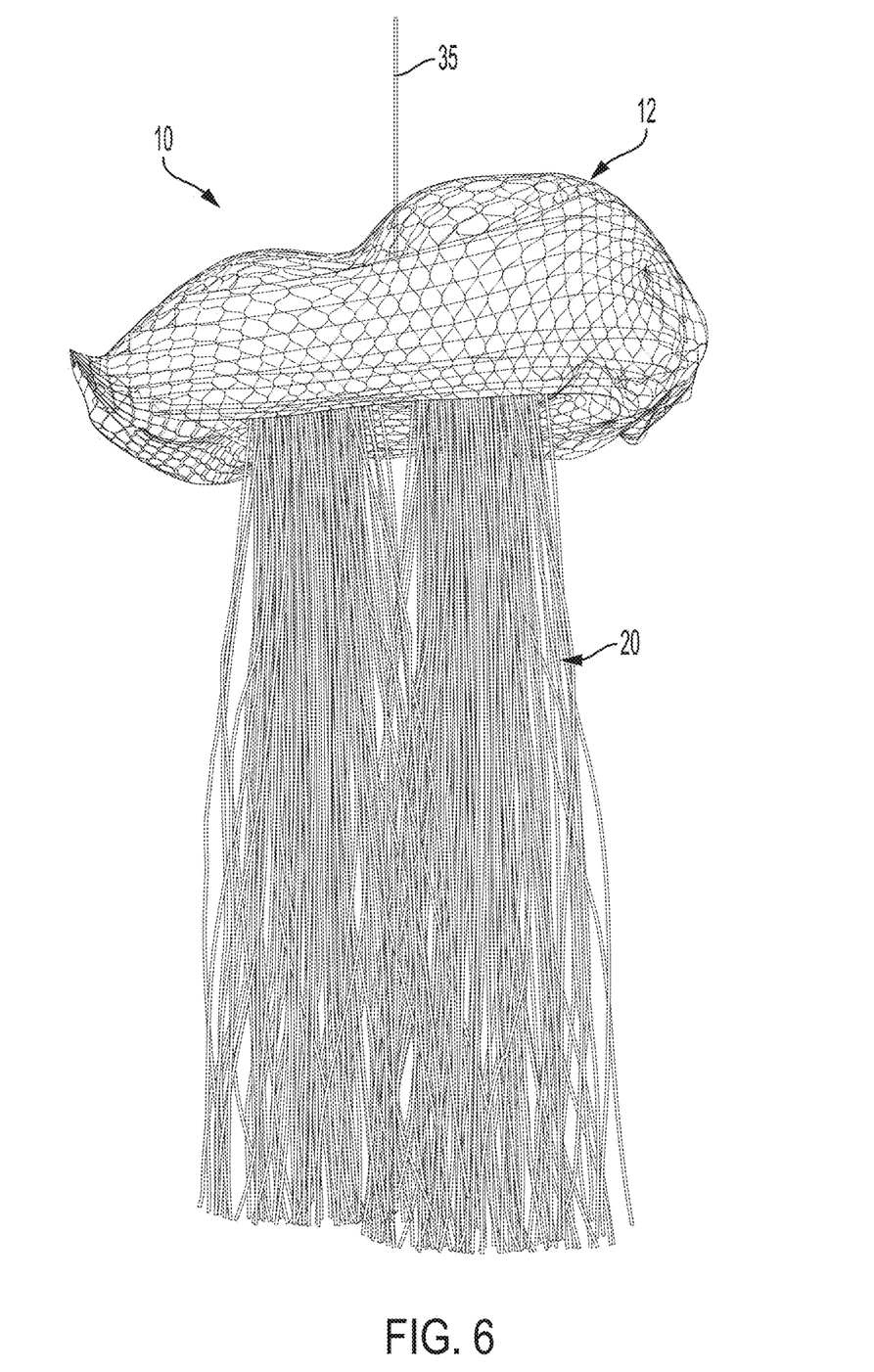
FIG. 6 is a rear view of the oil-absorbent flotation skimmer of FIG. 2.
Figure 7:
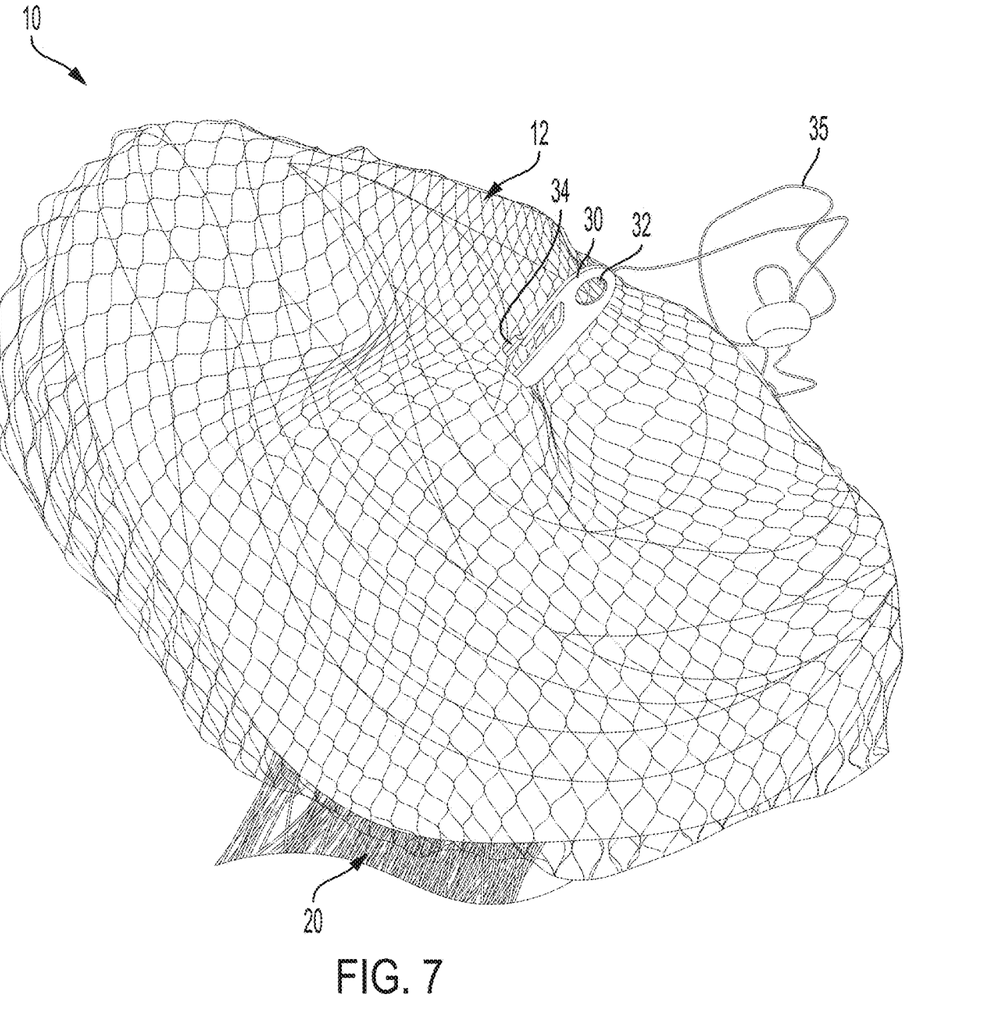
FIG. 7 is a top isometric view and FIG. 8 is a top view showing an upper absorbent flotation head of the oil-absorbent flotation skimmer of FIG. 2.
Figure 8:
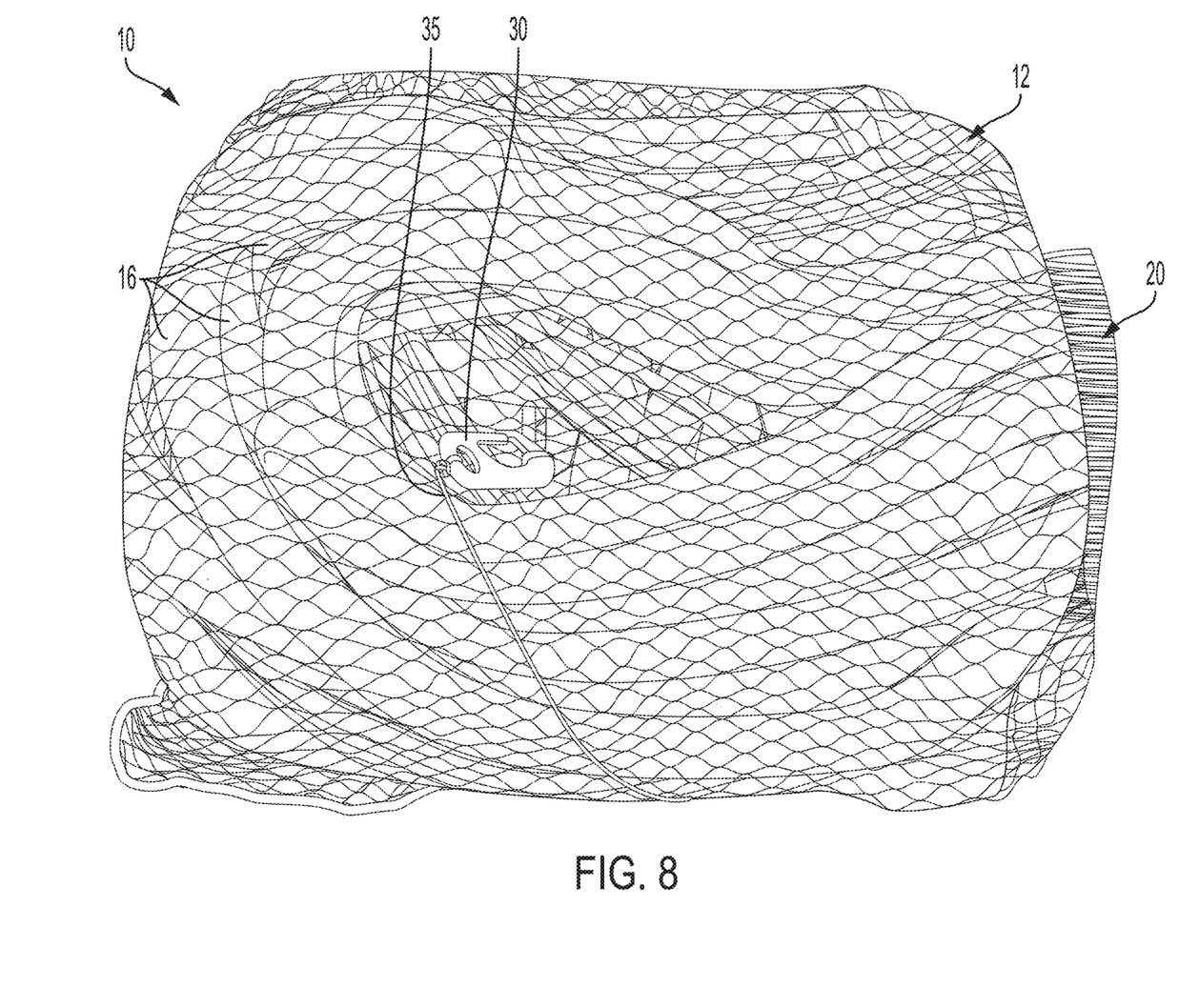
Figure 9:
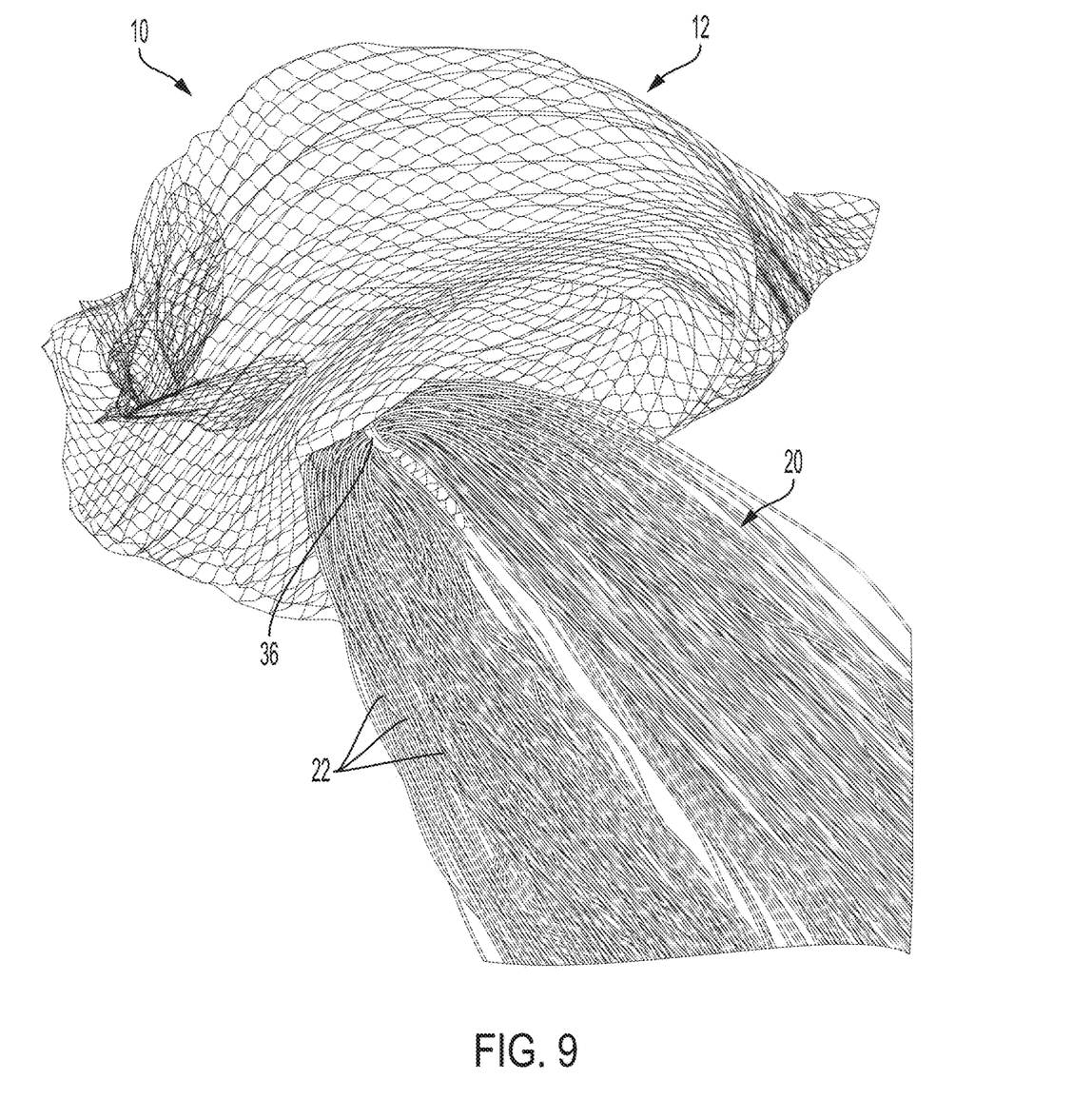
FIG. 9 is a bottom isometric view and FIG. 10 is a bottom front perspective view showing the upper absorbent flotation head and absorbent strands of the oil-absorbent flotation skimmer of FIG. 2.
Figure 10:
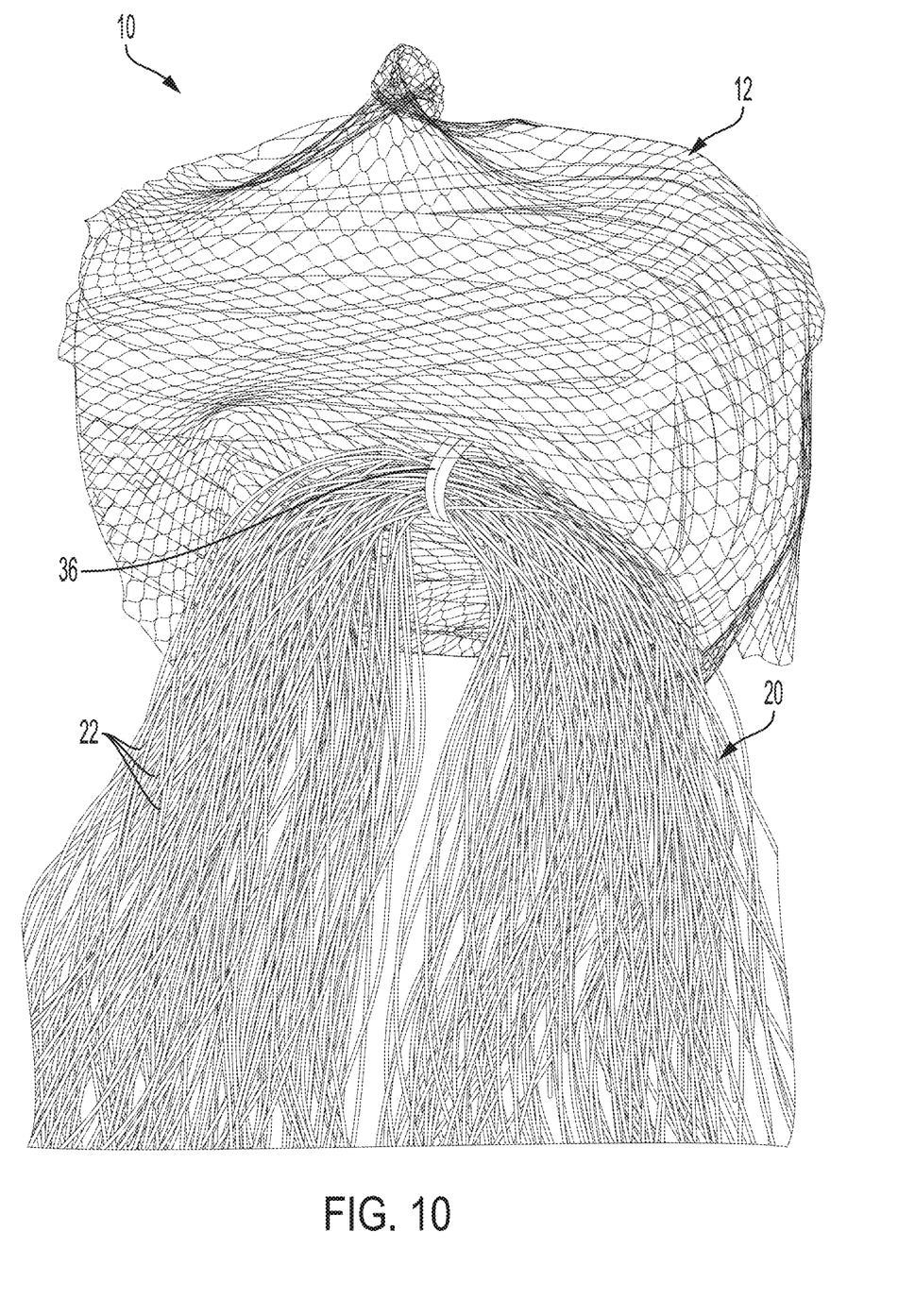

FIG. 1 illustrates a passive oil-absorbent flotation skimmer 10 deployed in a body of water W in accordance with an embodiment of the present invention. The body of water W may be contained in stormwater catch basins, water holding tanks, vaults, sumps, bilges and the like. The oil-absorbent flotation skimmer 10 includes an absorbent flotation head 12 with multiple absorbent strands 22 suspended therefrom. As more fully described below, the oil-absorbent flotation skimmer 10 passively floats on the body of water W, which has a waterline L. The oil-absorbent skimmer 10 thus free-floats on the surface of the water W at the waterline L, e.g., without the requirement of being supported by any surrounding structure. In the deployed condition shown in FIG. 1, the absorbent flotation head 12 floats on the water at the waterline L, and the multiple absorbent strands 22 fan out in a spread pattern having a spread width S and spread depth D, as more fully described below.

FIGS. 2-10 show various views of the oil-absorbent flotation skimmer 10 of FIG. 1 prior to deployment in a body of water. As shown most clearly in FIGS. 2 and 3, the oil-absorbent flotation skimmer 10 includes a deployment clip 30 adjacent the top of the flotation head 12, which may be used to attach the flotation skimmer 10 to a support cord 35. The support cord 35 may be used to deploy the flotation skimmer 10 by lowering the flotation skimmer 10 into a body of oil-containing water, and may be used to recover the flotation skimmer 10 and at least a portion of the oil from the water W after use. The flotation skimmer 10 may typically have a total weight per unit of from 1.0 to 3.6 pounds, for example, about 1.8 pounds, and an oil holding capacity per unit of from 0.8 to 2.8 gallons, for example, about 1.4 gallons.

The absorbent flotation head 12 includes a liquid permeable cover 14 with multiple absorbent strips 16 contained therein. In the embodiment shown, the liquid permeable cover 14 is made of an open mesh material that may be made of polyester or the like. However, any other suitable liquid permeable material having any suitable mesh size may be used, such as polypropylene, polyethylene and nylon. The liquid permeable cover 14 may thus be made of any other suitable material that allows water to pass therethrough while containing the absorbent strips 16.

In certain embodiments, both the upper absorbent strips 16 and lower absorbent strands 22 are made of materials that float on water in order to optimize contact and absorption of oil or other hydrocarbons floating on or near the surface of the water. As shown in FIG. 1, a portion of the absorbent strands 22 may float in a generally fan-like pattern below the surface of the water W.

The multiple absorbent strands 22 are provided in the form of a bundle 20. As shown most clearly shown in FIGS. 3, 9 and 10, the absorbent flotation strand bundle 20 is secured to the absorbent flotation head 12 by a connector loop 36 that is supported by a connecting member 38 in the form of a strap, cord, wire or the like that is attached to the deployment clip 30.

The absorbent flotation head 12 may have a typical height of from 0.75 to 12 inches, for example, from 1 to 10 inches, or from 2 to 8 inches. As described above, the waterline L of the water W may be located within the height of the absorbent flotation head 12 when the oil-absorbent flotation skimmer 10 is deployed in the water. The absorbent flotation head may typically have a length of from 6 to 18 inches, or from 8 to 16 inches, and may typically have a width of from 4 to 16 inches, or from 5 to 12 inches. In a particular embodiment, the flotation head may have a width of about 12 inches, a depth of about 10 inches, and a height of about 4 inches. However, any other suitable shapes and dimensions may be used for the absorbent flotation head 12.

Figure 11:
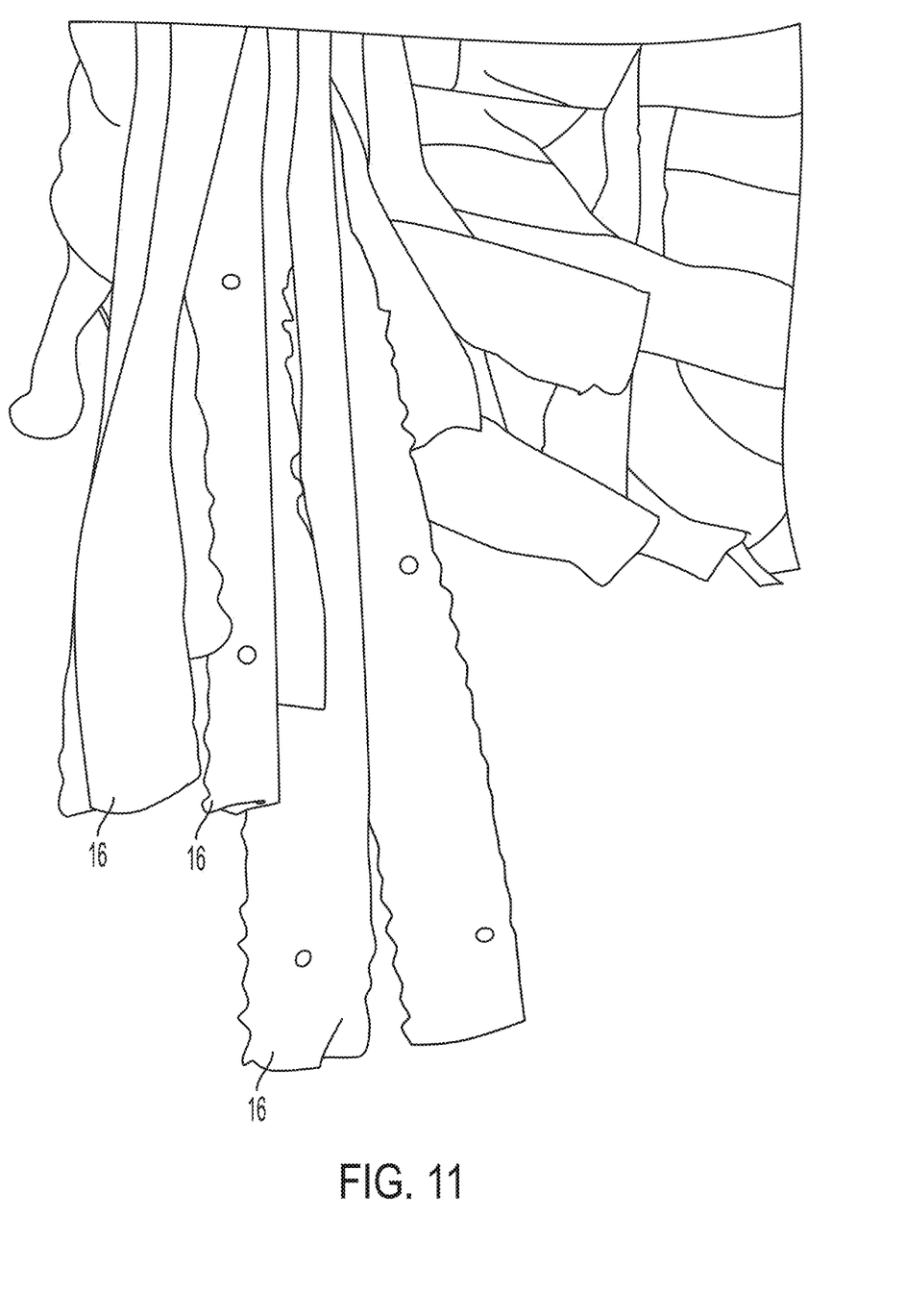
FIG. 11 is an enlarged view showing portions of absorbent strips that may be contained within a flotation head of an oil-absorbent flotation skimmer of the present invention.

FIG. 11 is an enlarged view of several of the absorbent strips 16. The absorbent strips 16 may be made of any suitable material such as polypropylene, polyethylene, rubber, nylon, acrylic, or hydrophobic-treated cellulose that absorbs hydrocarbons such as oil but does not substantially absorb water. The absorbent strips 16 may thus be hydrophobic. For example, foams with an apparent density of less than 1 g/cc may be used as the absorbent strip 16 to increase buoyance.

The absorbent strips 16 may be provided in any suitable numbers and lengths for containment within the liquid permeable cover 14. The oil-absorbent strips 16 may be provided in multiple segments having typical lengths of from 2 to 100 inches. The total overall length of the segments of the absorbent strips 16 may typically be at least 50 feet, for example, from 100 to 400 feet, or from 220 to 280 feet. The absorbent strips 16 may have typical cross-sectional lengths of from 0.2 to 1 inch and cross-sectional widths of from 0.1 to 0.3 inch. However, any suitable cross-sectional lengths and widths may be used.

The absorbent strands 22 may be secured together into the bundle 20 by means of the connector loop 36, which is located at a midpoint along the average overall length to form the strand bundle 20. Each strand 22 may have the same length or different lengths. In the embodiment shown in the figures, the absorbent strands 22 have substantially the same length. Each strand 22 typically has a length measured from a first end of the strand to a second end of the strand of from 24 to 60 inches, or from 30 to 50 inches, or about 44 inches. When the absorbent strands 22 are spread out from the absorbent flotation head 12 into the water W as shown in FIG. 1, the strands 22 have a typical spread width S of from 24 to 60 inches, for example, from 30 to 50 inches, or about 44 inches. The absorbent strands 22 may have a typical spread depth D of at least 6 inches, for example, from 12 to 30 inches, or 15 to 25 inches, or about 22 inches. The absorbent strands may have a density close to that of water, e.g., 1 g/cm$^3$±0.2/g/cm$^3$ or ±0.1 g/cm$^3$. For example, the absorbent strands 22 may have a density that is equal to or less than 1 g/cm$^3$.

The flotation skimmer 10 may comprise at least 50 of the absorbent strands 22, or at least 100, or at least 200, or at least 300 of the absorbent strands 22, for example, from 300 to 850 of the absorbent strands 22, or from 400 to 750, or from 500 to 650.

The absorbent strands 22 may typically have a total linear length of at least 200 feet, or at least 400 feet, or at least 600 feet, for example, from 800 to 3,800 feet, or from 1,800 to 2,400 feet. The absorbent strands 22 may have typical cross-sectional widths of from 2 to 28 mm (0.08 to 1.1 inch), and cross-sectional thicknesses of from 0.05 to 15 mm (0.002 to 0.6 inch). For example, cross-sectional widths of from 2 to 16 mm (0.08 to 0.63 inch), and cross-sectional thicknesses of from 0.05 to 5 mm (0.002 to 0.2 inch), or cross-sectional widths of from 2 to 5 mm (0.08 to 0.2 inch), and cross-sectional thicknesses of from 0.1 to 0.5 mm (0.004 to 0.2 inch). However, any other suitable dimensions may be used.

Figure 12:
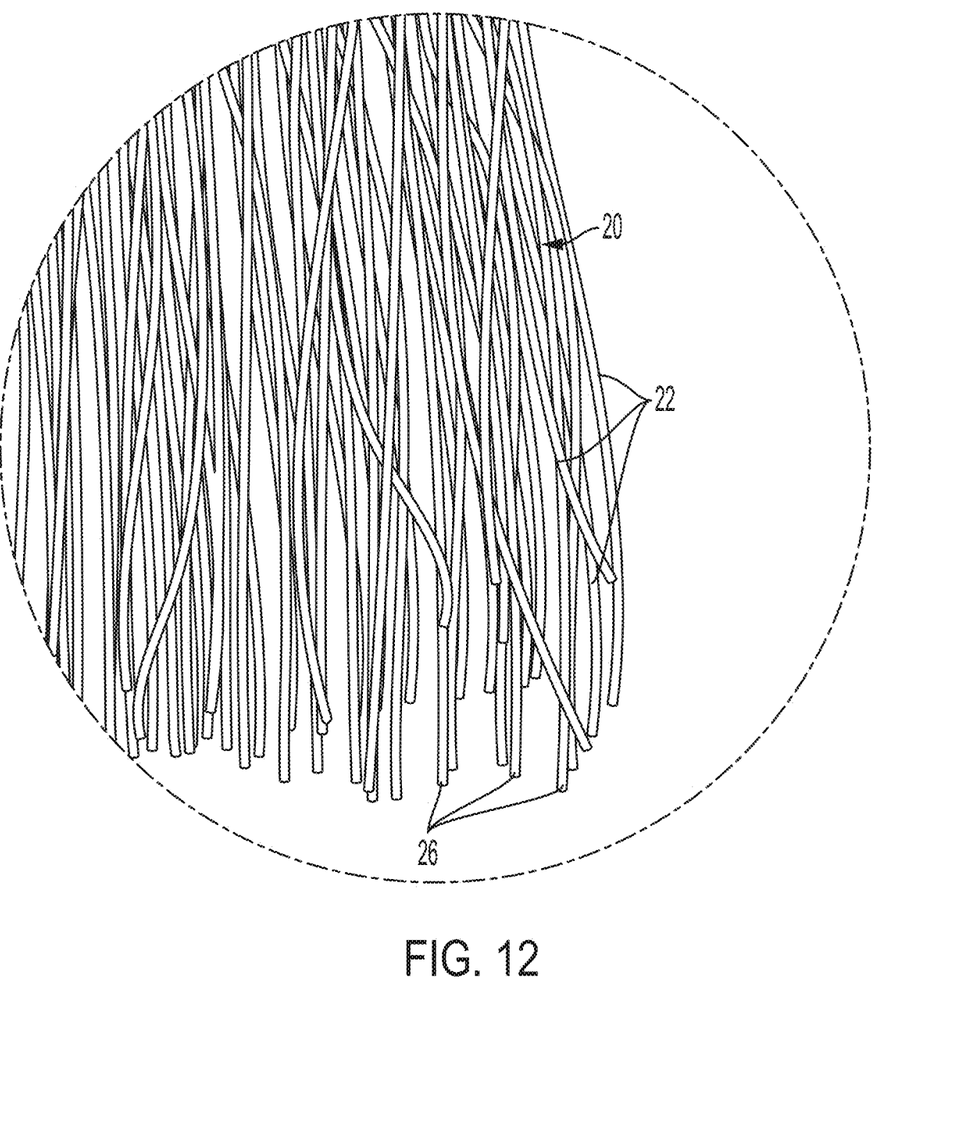
FIG. 12 is an enlarged view taken from FIG. 1 showing portions of oil-absorbent strands of an oil-absorbent flotation skimmer of the present invention.

FIG. 12 is an enlarged view of the relatively thin absorbent strands 22 attached to the underside of the absorbent flotation head 12. The absorbent strands 22 may be made of polyester, polypropylene, polyethylene, rubber, nylon, or acrylic that absorb hydrocarbons such as oil but do not substantially absorb water. The absorbent strands 22 may thus be hydrophobic. The absorbent strands 22 may be produced by a fibrillation process in which polypropylene or other polymer is extruded into a thin sheet and cut to form slits in the thin sheet. Each fibrillated strand includes many slits that function to capture oil but not to retain water.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

Whereas particular embodiments of this invention have been described above for purposes of illustration, it will be evident to those skilled in the art that numerous variations of the details of the present invention may be made without departing from the invention as defined in the appended claims.

What is claimed is:

1. An oil-absorbent flotation skimmer comprising:
an absorbent flotation head structured and arranged to float on water when the oil-absorbent flotation skimmer is deployed into the water, the absorbent flotation head comprising a liquid permeable cover, and oil-absorbent strips within the liquid permeable cover; and
multiple oil-absorbent strands attached to the absorbent flotation head structured and arranged to spread out from the absorbent flotation head into the water when the oil-absorbent flotation skimmer is deployed into the water, wherein the oil-absorbent strands are provided in the form of a strand bundle that is attached to an underside of the absorbent flotation head.

2. The oil-absorbent flotation skimmer of claim 1, wherein the oil-absorbent strands are secured together at a midpoint of the strand bundle.

3. The oil-absorbent flotation skimmer of claim 1, wherein each of the oil-absorbent strands has a length measured from a first end to a second end of the oil-absorbent strand of from 24 to 60 inches.

4. The oil-absorbent flotation skimmer of claim 3, wherein when the oil-absorbent strands are spread out from the absorbent flotation head into the water, the oil-absorbent strands have a spread width of from 24 to 60 inches and a spread depth of at least 6 inches.

5. The oil-absorbent flotation skimmer of claim 4, wherein the spread depth is from 12 to 30 inches.

6. The oil-absorbent flotation skimmer of claim 1, comprising at least 100 of the oil-absorbent strands.

7. The oil-absorbent flotation skimmer of claim 1, comprising from 400 to 750 of the oil-absorbent strands.

8. The oil-absorbent flotation skimmer of claim 1, wherein the oil-absorbent strands have a total linear length of at least 600 feet.

9. The oil-absorbent flotation skimmer of claim 1, wherein the oil-absorbent strands have a total linear length of from 800 to 3,800 feet.

10. The oil-absorbent flotation skimmer of claim 1, wherein the oil-absorbent strands have cross-sectional widths of from 0.08 to 1.1 inch, and cross-sectional thicknesses of from 0.002 to 0.6 inch.

11. The oil-absorbent flotation skimmer of claim 1, wherein the oil-absorbent strands are made of a hydrophobic material.

12. The oil-absorbent flotation skimmer of claim 1, wherein the oil-absorbent strands comprise polyester, polypropylene, polyethylene, nylon, acrylic, rubber or a combination thereof.

13. The oil-absorbent flotation skimmer of claim 1, wherein the oil-absorbent strands are fibrillated.

14. The oil-absorbent flotation skimmer of claim 1, wherein the absorbent flotation head has a height of from 0.75 to 12 inches, and a waterline of the water is located within the height of the absorbent flotation head when the oil-absorbent flotation skimmer is deployed in the water.

15. The oil-absorbent flotation skimmer of claim 1, wherein the oil-absorbent strips have widths of from 0.2 to 1 inch, thicknesses of from 0.1 to 0.3 inch, are provided in segments having lengths of from 2 to 100 inches, and a total overall length of the segments of the oil-absorbent strips is at least 50 feet.

16. The oil-absorbent flotation skimmer of claim 15, wherein the total overall length of the segments of the oil-absorbent strips is from 100 to 400 feet.

17. The oil-absorbent flotation skimmer of claim 1, wherein the oil-absorbent strips are made of a hydrophobic material and have a density of less than 1 g/cc.

18. The oil-absorbent flotation skimmer of claim 1, wherein the oil-absorbent strips comprise polyester, polypropylene, nylon, acrylic, rubber or a combination thereof.

19. The oil-absorbent flotation skimmer of claim 1, wherein the liquid permeable cover comprises polypropylene mesh.

20. The oil-absorbent flotation skimmer of claim 1, wherein the oil-absorbent flotation skimmer has a weight of from 1 to 4 pounds, and an oil retention capacity of at least 0.5 gallon.

21. A method of removing oil from water contained in a water-containing structure, the method comprising:
deploying the oil-absorbent flotation skimmer of claim 1 into the water-containing structure;
allowing the deployed oil-absorbent flotation skimmer to freely float on a surface of the water to capture oil contained in the water; and
recovering the oil-absorbent flotation skimmer and captured oil from the water-containing structure.

22. An oil-absorbent flotation skimmer comprising:
an absorbent flotation head structured and arranged to float on water when the oil-absorbent flotation skimmer is deployed into the water, the absorbent flotation head comprising a liquid permeable cover, and oil-absorbent strips within the liquid permeable cover; and
multiple oil-absorbent strands attached to the absorbent flotation head structured and arranged to spread out from the absorbent flotation head into the water when the oil-absorbent flotation skimmer is deployed into the water, wherein each of the oil-absorbent strands has a length measured from a first end to a second end of the oil-absorbent strand of from 24 to 60 inches, when the oil-absorbent strands are spread out from the absorbent flotation head into the water, the oil-absorbent strands have a spread width of from 24 to 60 inches and a spread depth of at least 6 inches.

23. The oil-absorbent flotation skimmer of claim 22, wherein the oil-absorbent strands are provided in the form of a strand bundle that is attached to an underside of the absorbent flotation head.

\* \* \* \* \*